United States Patent
Demorais et al.

(10) Patent No.: US 10,487,896 B2
(45) Date of Patent: Nov. 26, 2019

(54) PISTON BRAKE CALIPER AND BRAKE SYSTEM

(71) Applicant: MANDO CORPORATION, Gyeonggi-do (KR)

(72) Inventors: Antonio Eduardo Demorais, Novi, MI (US); Suresh Babu Koduri, Novi, MI (US); Daniel Alan Smith, White Lake, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/953,406

(22) Filed: Apr. 14, 2018

(65) Prior Publication Data

US 2019/0316644 A1 Oct. 17, 2019

(51) Int. Cl.
| | |
|---|---|
| *F16D 65/18* | (2006.01) |
| *F16D 65/56* | (2006.01) |
| *F16D 55/228* | (2006.01) |
| *F16D 121/04* | (2012.01) |
| *F16D 121/24* | (2012.01) |
| *B60T 13/74* | (2006.01) |
| *F16D 125/40* | (2012.01) |

(Continued)

(52) U.S. Cl.
CPC ......... *F16D 65/567* (2013.01); *F16D 55/228* (2013.01); *F16D 65/18* (2013.01); *B60T 7/102* (2013.01); *B60T 13/741* (2013.01); *F16D 2121/04* (2013.01); *F16D 2121/24* (2013.01); *F16D 2125/06* (2013.01); *F16D 2125/08* (2013.01); *F16D 2125/40* (2013.01); *F16D 2125/582* (2013.01); *F16D 2125/64* (2013.01)

(58) Field of Classification Search
CPC ...... F16D 55/228; F16D 65/18; F16D 65/567; F16D 2125/40
See application file for complete search history.

(56) References Cited

U.S. PATENT DOCUMENTS 3,366,200 A * 1/1968 Hayes ............... B60T 1/065
  188/250 B
3,920,102 A 11/1975 Ito
(Continued)

FOREIGN PATENT DOCUMENTS

| JP | 5-248458 | 9/1993 |
|---|---|---|
| JP | 10-9302 | 1/1998 |
| JP | 11-230205 | 8/1999 |

*Primary Examiner* — Vishal R Sahni
(74) *Attorney, Agent, or Firm* — Ladas & Parry, LLP (57) ABSTRACT

Brake systems and methods of their operation are disclosed, including a brake system comprising: a rotor comprising: a hub configured for attachment to a vehicle; and a first and a second contact surfaces; and a web connecting the first and second contact surfaces to the hub; a first and a second brake pad located adjacent to the respective first and second contact surfaces of the brake rotor, wherein the first and the second brake pads are configured to press on the respective first and second contact surfaces during operation of the brake system; a first brake piston configured to push the first brake pad against the first contact surface of the rotor during operation of the brake system; wherein upon operation of the brake system in a first operation mode, the first piston moves the second contact surface toward the second piston by deflection of the rotor at the web.

15 Claims, 13 Drawing Sheets

(51) Int. Cl.
  *F16D 125/08* (2012.01)
  *F16D 125/58* (2012.01)
  *F16D 125/64* (2012.01)
  *B60T 7/10* (2006.01)
  *F16D 125/06* (2012.01)

(56) References Cited

U.S. PATENT DOCUMENTS

| | | | |
|---|---|---|---|
| 2002/0063022 A1* | 5/2002 | Shaw | F16D 65/18 |
| | | | 188/72.1 |
| 2002/0166736 A1 | 11/2002 | Yunba | |
| 2004/0188189 A1* | 9/2004 | Baumgartner | F16D 55/225 |
| | | | 188/71.7 |
| 2005/0241894 A1* | 11/2005 | Baumgartner | F16D 65/567 |
| | | | 188/79.51 |
| 2006/0131112 A1* | 6/2006 | Hashida | B60T 17/16 |
| | | | 188/71.9 |
| 2014/0110196 A1* | 4/2014 | Burgoon | B60T 13/22 |
| | | | 188/72.3 |
| 2015/0053512 A1* | 2/2015 | Lee | F16D 65/38 |
| | | | 188/72.3 |
| 2017/0130788 A1* | 5/2017 | Noguchi | F16D 55/228 |

\* cited by examiner

PISTON BRAKE CALIPER AND BRAKE SYSTEM

TECHNICAL FIELD

This disclosure relates to brake systems and brake calipers including disk brake systems having opposed pistons and/or deflectable rotors.

BACKGROUND

Brake systems, such as disk brake systems on vehicles such as cars and trucks, can include calipers and pistons within the calipers. In operation, the disk brake system can press brake pads against opposite contact surfaces of a brake rotor in order to increase friction to cause a braking effect. In some embodiments, one or more pistons can be present on only one side of the brake rotor, and in some embodiments, one or more brake pistons can be present on each side of the brake rotor.

SUMMARY

In a first aspect disclosed herein, a disk brake system is provided. The disk brake system comprising: a brake rotor comprising: a hub configured for attachment to a vehicle; and a first and a second contact surface; and a web connecting the first and second contact surfaces to the hub; a first and a second brake pad located adjacent to the respective first and second contact surfaces of the brake rotor, wherein the first and the second brake pads are configured press on the respective first and second contact surfaces of the brake rotor during operation of the brake system; a first brake piston configured to push the first brake pad against the first contact surface of the brake rotor during operation of the brake system; wherein upon operation of the brake system in a first operation mode, the first brake piston moves the second contact surface toward the second brake piston by deflection of the rotor at the web.

In a second aspect disclosed herein, a disk brake caliper is provided. The disk brake caliper comprising: a caliper housing; a first brake piston; a second piston opposed to the first brake piston, the second piston having a front side facing the first piston and a reverse side facing away from the first piston; a nut in communication with an interior of the first brake piston; and a spindle in threaded communication with the nut; wherein upon rotation of the spindle, a thread position of the spindle changes in relation to the nut, extending the nut so as to push the first piston toward the second piston; a pad adjustor in operational communication with the second brake piston, the pad adjustor comprising: an adjustor spindle; an adjustor nut in threaded communication with the adjustor spindle; a first spring; a second spring; and wherein the first spring forces the adjustor nut against the reverse side of the second piston and the second spring forces the adjustor nut against the caliper housing.

In a third aspect disclosed herein is a method of operating a brake system as a parking brake. The method comprising operating a brake system comprising: a brake rotor comprising: a hub configured for attachment to a vehicle; and a first and a second contact surface; and a web connecting the first and second contact surfaces to the hub; a first and a second brake pad located adjacent to the respective first and second contact surfaces of the brake rotor, wherein the first and the second brake pads are configured press on the respective first and second contact surfaces of the brake rotor during operation of the brake system; a first brake piston configured to push the first brake pad against the first contact surface of the brake rotor during operation of the brake system; wherein upon operation of the brake system in a first operation mode, the first brake piston moves the second contact surface toward the second brake piston by deflection of the rotor at the web by pushing the first brake piston against the first brake pad to push the first brake pad against the first contact surface of the brake rotor whereupon the brake system in a first operation mode, the first brake piston moves the second contact surface toward the second brake piston by deflection of the rotor at the web.

In a fourth aspect disclosed herein is a method of operating a brake system as a parking brake. The method comprising operating a brake system comprising: a brake rotor comprising: a hub configured for attachment to a vehicle; and a first and a second contact surface; and a web connecting the first and second contact surfaces to the hub; a first and a second brake pad located adjacent to the respective first and second contact surfaces of the brake rotor, wherein the first and the second brake pads are configured press on the respective first and second contact surfaces of the brake rotor during operation of the brake system; a first brake piston configured to push the first brake pad against the first contact surface of the brake rotor during operation of the brake system; and further comprises a parking brake actuator, the parking brake actuator comprising: a nut in communication with an interior of the first brake piston; a spindle in threaded communication with the nut; and a parking brake rotator configured to rotate the spindle in relation to the nut; wherein upon operation of the brake system in a first operation mode, the first brake piston moves the second contact surface toward the second brake piston by deflection of the rotor at the web, and upon actuation of the parking brake, the brake system operates in the first operation mode and the parking brake rotator rotates the spindle which changes the thread position of the spindle in relation to the nut, extending the nut to push the first piston which pushes the first brake pad against the brake rotor and pushes the brake rotor against the second brake pad.

BRIEF DESCRIPTION OF THE DRAWINGS

FIG. 5a shows an embodiment of a brake piston as disclosed herein.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Brake Caliper

Figure 1A:
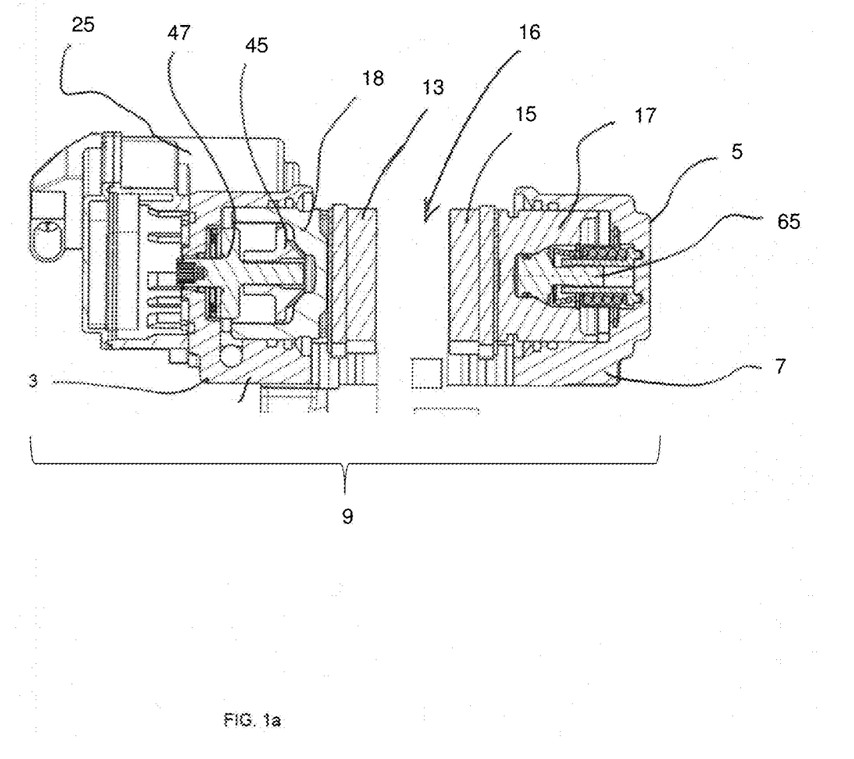
FIG. 1a shows an embodiment of a brake caliper assembly as described herein.

FIG. 1a shows an embodiment of a brake caliper assembly 9 comprising a brake caliper 7 having a bridge 4 connecting an inboard leg 3 with an outboard leg 5. A first piston 18 can be present in the inboard leg 2 and a second piston 17 can be present in the outboard leg 5. A first brake pad 13 and a second brake pad 15 can be located within a rotor space 16 located between and in operational communication with the first piston 18 and the second piston 17, respectively, in the caliper assembly shown in FIG. 1a. While FIG. 1a shows a first piston 18 and a second piston 17 in operational communication with respective first and second brake pads 13, 15, it is to be understood that in some embodiments, a single piston, either the first piston 18 located in the inboard leg 3 or the second piston 17 located in the outboard leg 5, can also be successfully used without the other piston. In some such embodiments, the brake pad without an associated piston can be supported by, for example, the inboard leg 3 or outboard leg 5, either directly or indirectly, such as with one or more fingers extending along the back of the brake pad.

Figure 1B:
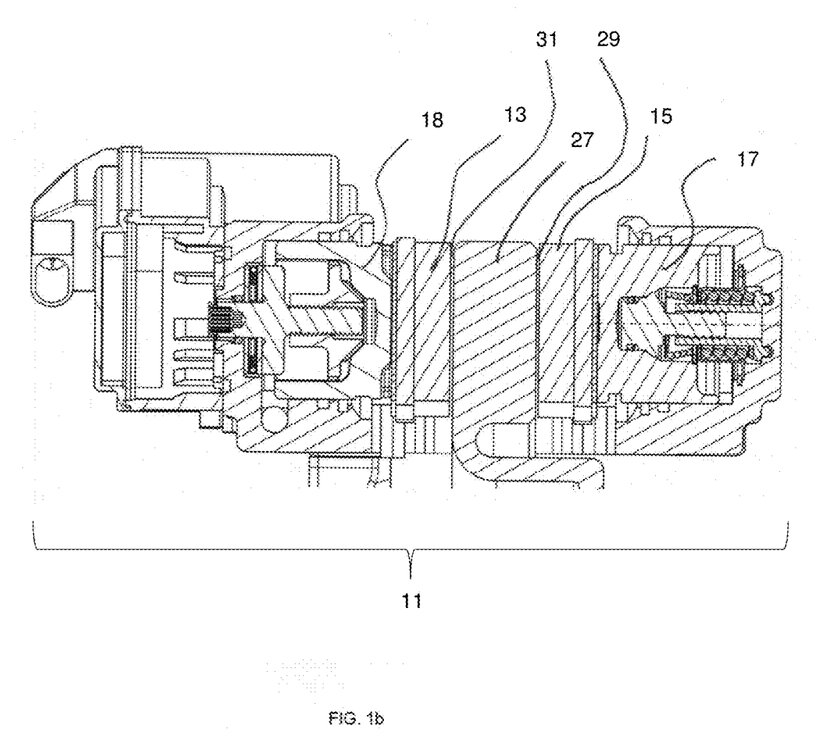
FIG. 1b shows an embodiment of a brake system as disclosed herein.

The rotor space 16 can be configured to receive a brake rotor 27 such as is shown in FIG. 1b. Here, in an embodiment of a brake assembly 11, a first brake pad 13 can brakingly interact with a first contact surface 31 of brake rotor 27 and a second brake pad 15 can brakingly interact with a second contact surface 29 of brake rotor 27. During operation of the brake assembly, one or more of the first and second piston 18, 17 can push one or more of first and second brake pads 13, 15 against the respective rotor contact surfaces so as to increase friction and create a braking effect.

Figure 2A:
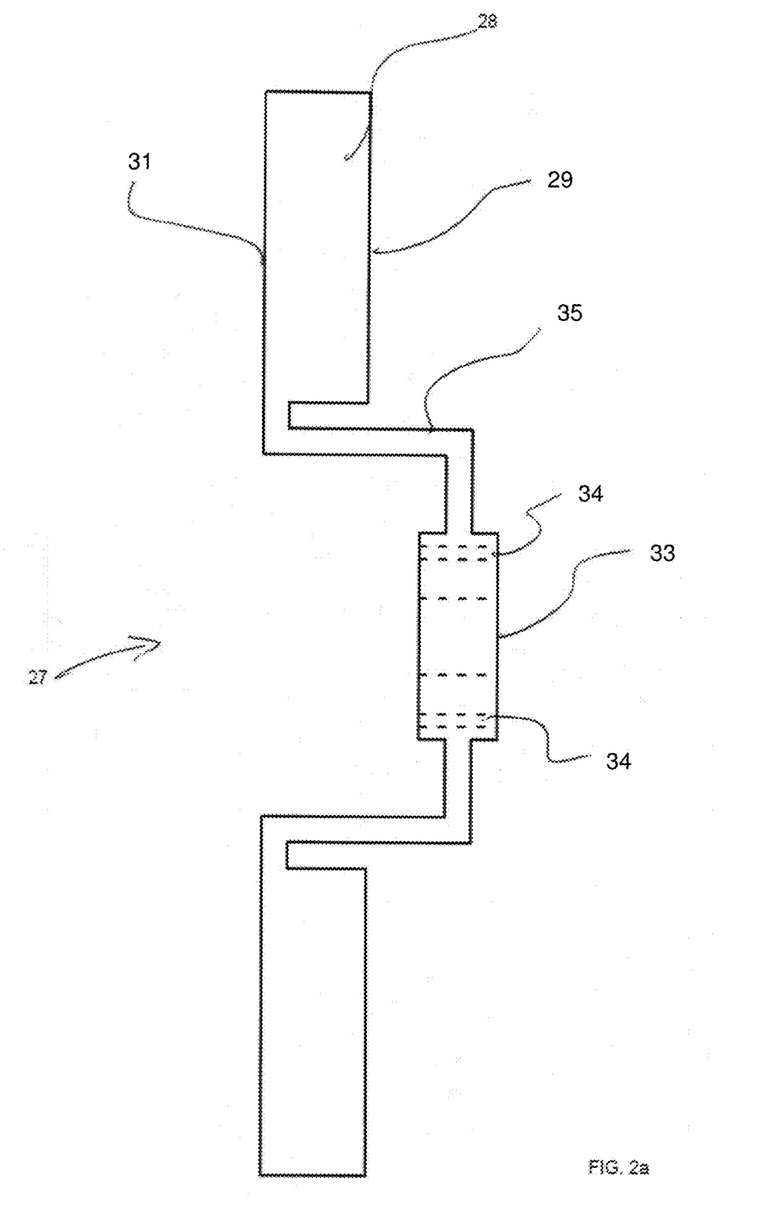
FIG. 2a shows an embodiment of a brake rotor as disclosed herein.

As shown in FIG. 2a, a brake rotor 27 can have a disk plate 28 with a first contact surface 31 and a second contact surface 29 connected to a hub 33 through a web 35. The hub can be configures for attachment to a vehicle, such as be providing holes 34 passing through the hub 33 configured for studs or bolts to pass through the holes 34. In some embodiments, the disk plate 28 can be a solid structure. In some embodiments, the disk plate 28 can be hollow. In some embodiments, the disk plate 28 can be ventilated, such as by providing an air flow path from an edge adjacent the web 35 to an outer peripheral edge and/or by providing holes or grooves in one or both of the first and second contact surfaces 31, 29.

Figure 2B:
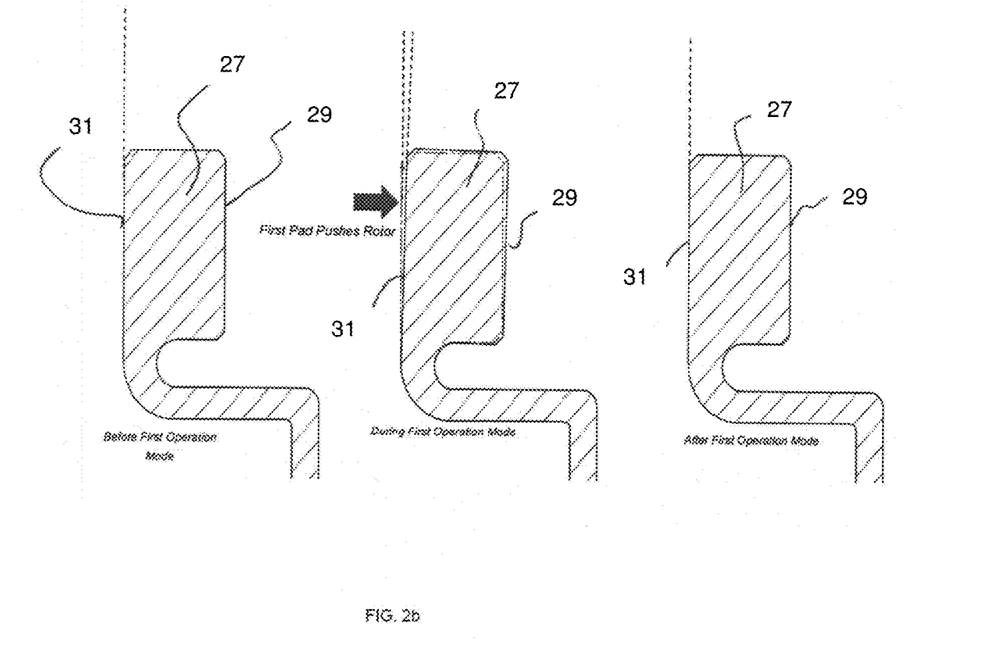
FIG. 2b shows deflection of an embodiment of a brake rotor as disclosed herein.

As shown in FIG. 2b, before initiation of the first operation mode, the rotor 27 and the first and second contact surfaces 31, 29 are not deflected. Upon initiation of the first operation mode, the rotor 27 and the first and second contact surfaces 31, 29 are deflected to the side, as indicated by the diverging broken lines representing the rest position of the first surface 31 (and rotor 27) and the first operation mode position of the first surface 31 (and rotor 27.)

The web 35 can be deflectable such that when the first piston 18 pushes against the first brake pad 13 and first brake pad 13 in turn pushes against the first contact surface 31 of the rotor, the force exerted by the first piston 18 can deflect the first and second contact surfaces 31, 29 toward the second brake pad 13 such that the second contact surface 29 contacts the second brake pad 15, with the result of a braking effect from the contact of the second surface 29 with the second brake pad 15.

The web 35, in some embodiments, can be configured to have a thin portion to facilitate the deflection of the disk plate 28 and first and second contact surfaces 31, 29 to one side or the other. In some embodiments, the web 35 can comprise one or more bends and/or angles, so as to extend the length of the web as the web is traversed from the hub 33 to the disk plate 28 and the first and second contact surface 31, 29. In some embodiments, the web 35 can be a series of connected angles or curves connected by straight or curved portions. In some embodiments, the web 35 can be the same material as another portion of the rotor 27, such as the hub 33 or the disk plate 28, and in some embodiments, the web 35 can be a different material from another portion of the rotor 27. In some embodiments, the web 35 can be the same material as another portion of the rotor 27, but have a different hardness, tensile strength or modulus of elasticity. In some embodiments, the web 35 can have a different property of hardness, tensile strength or modulus than another portion of the rotor 27 due to the use of a different grade of material or due to a different heat treatment step being used in its construction than the other portion of the rotor 27. In some embodiments, the web can be steel or iron.

In some embodiments, the web 35 can be thinner than the disk plate 28 or can be the same thickness or be thicker than the disk plate 28. In some embodiments, the web 35 can be thinner, the same thickness or thicker than the hub 33.

Figure 3:
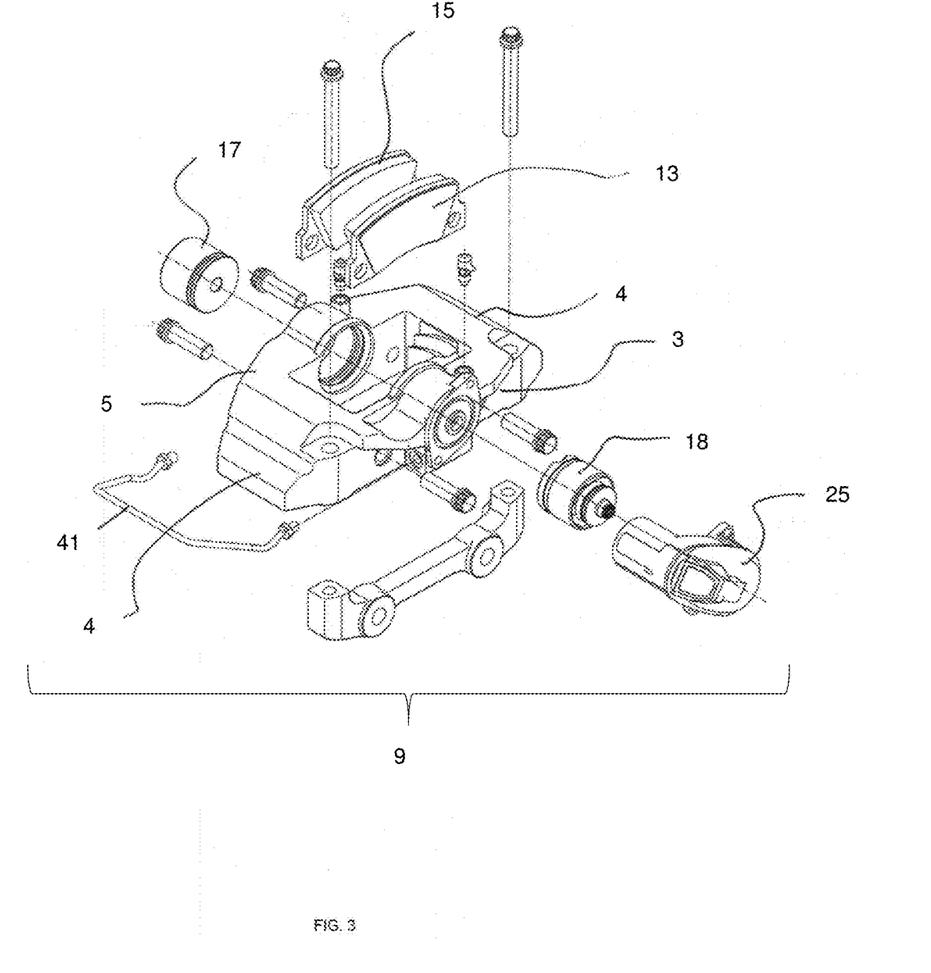
FIG. 3 shows an exploded diagram of an embodiment of a brake caliper assembly as disclosed herein.

FIG. 3 shows an exploded diagram of an embodiment of a brake caliper assembly 9. The brake caliper assembly 9 shown includes inboard and outboard legs 3, 5 interconnected by bridges 4. Within inboard leg 3 is a first piston 18. Within the outboard leg 5 is a second piston 17. Affixed to the inboard leg 3 is an electric motor 25 which is operatively connected to the first piston 18. Also shown is hydraulic line 41 which hydraulically interconnects the first piston 18 and second piston 17, and first and second brake pads 13, 15.

In a first mode of operation of the caliper assembly 9 and the brake system 11, the first brake piston 18 is actuated to push against the first brake pad 13 which then pushes the first contact surface 31 of the brake rotor 27, whereupon the brake rotor 27 is deflected to move the second contact surface 29 toward the second brake pad 15, whereupon friction between the brake rotor 27 and the first and second brake pads 13, 15 and a braking effect is achieved.

In some embodiments of a first mode of operation, the first brake piston 18 can be actuated by a rotator, such as a motor, for example an electric motor 25. In some embodiments of a first mode of operation, a rotator can be a lever arrangement that is actuated by a handle or pedal, such as a handle or pedal which an operator of the vehicle the brake system is installed on can actuate with the operator's hand or foot. In some embodiments, the first mode of operation can be used as a parking brake or an emergency or secondary brake for a vehicle. In some embodiments of a parking brake or an emergency or secondary brake, the first mode of operation can be initiated when the vehicle is already at a stop or near to a stop. In some embodiments of a parking brake or an emergency or secondary brake, the first mode of operation can be initiated while the vehicle is moving.

In a second mode of operation of the brake the caliper assembly 9 and the brake system 11, the first piston 18 and the second piston 17 can be actuated at the same time, such as by hydraulically, pneumatically or otherwise actuating both the first piston 18 and the second piston 17 at the same time or nearly the same time. In some embodiments, pneumatic or hydraulic force can be applied to both the first piston 18 and the second piston 17 from a common pneumatic or hydraulic source, such as a brake pedal, master cylinder, etc. In some embodiments, separate pneumatic or hydraulic sources can be used for each piston, where each source is actuated by a signal from a common source, such as a pedal, a switch, controller or computer (or microprocessor) based controller.

In the second mode of operation, the first and second piston 18, 17 press against respective first and second brake pads 13, 15 which then press against respective first and second contact surfaces 31, 29 of rotor 27, whereupon friction between the first and second brake pads 13, 15 and respective first and second contact surfaces 31, 29 increases and a braking effect is achieved. In some embodiments, the second mode of operation can be initiated while the vehicle the brake system is installed on is stopped and in some embodiments the second mode of operation can be initiated while the vehicle is moving.

Figure 4A:
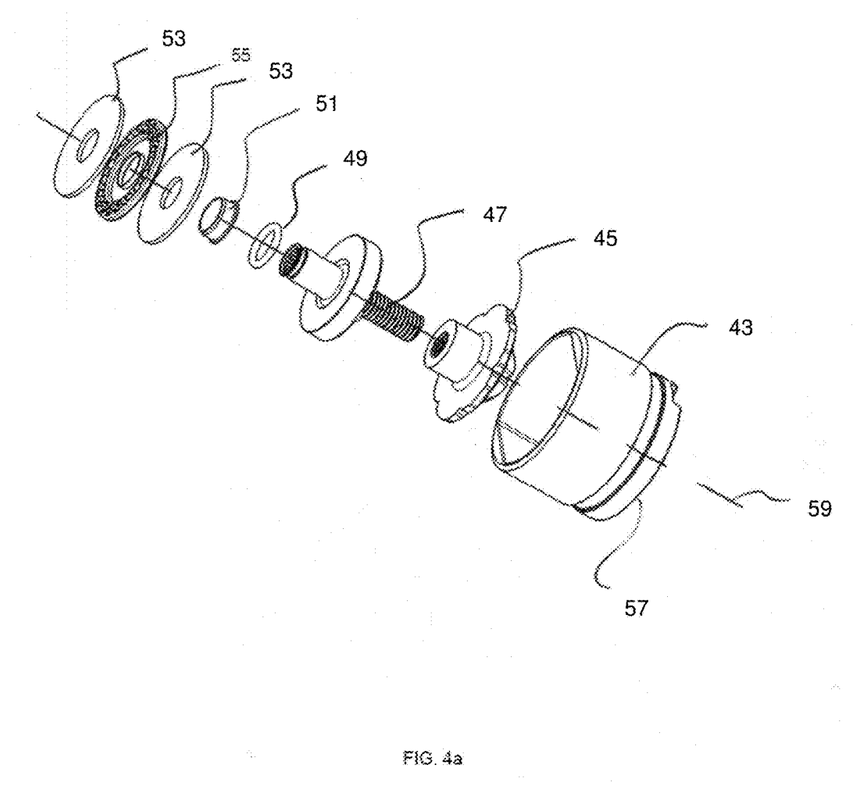
FIG. 4a shows an embodiment of a brake piston as disclosed herein.
Figure 4B:
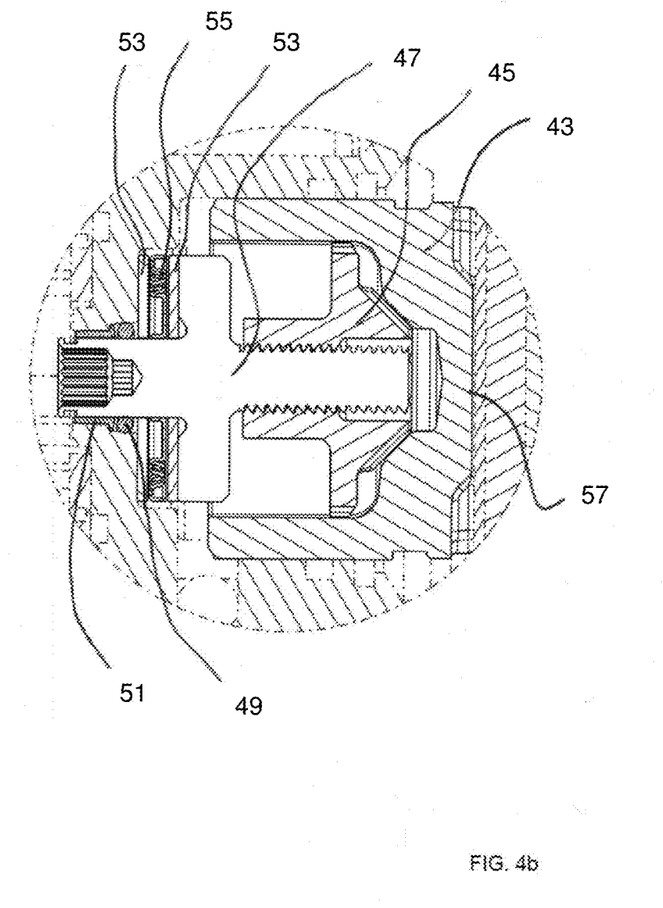
FIG. 4b shows an embodiment of a brake piston in a portion of a brake caliper housing as disclosed herein.

FIG. 4a shows an exploded diagram of an embodiment of a first piston 18 including features which facilitate mechanical operation in the first operation mode. Shown in FIG. 4 is a piston body 43, a nut 45, a spindle 47, an o-ring 49, a bush 51 and two washers 53 on either side of bearing 55. During operation in the first operation mode (or at another time when the rotator, such as an electric motor 25 that is in operational communication with the first piston 18 operates), the spindle 47 is rotated in relationship to the nut 45, with the result that the nut 45 moves longitudinally along the spindle 47 and within the piston body 43. In some embodiments, relative rotation between the spindle 47 and the nut 45 can be facilitated by way of interfacing surfaces on the outer perimeter of nut 45 and an inner cavity of piston body 43. Rotation of spindle 47 in a first direction can cause the nut to move toward bearing 55 and away from piston face 57. Rotation of spindle 47 in a second direction, the second direction being opposite to the first direction, can cause the nut to move toward the piston face 57 and away from bearing 55. Rotation of spindle 47 for a sufficient duration can then cause the nut to push in the direction of the longitudinal axis 59 against piston body 43, which in turn can cause the piston face 57 to push against the first brake pad 13. FIG. 4b shows an embodiment of a first piston assembled in an inboard leg of a brake caliper.

Figure 5B:
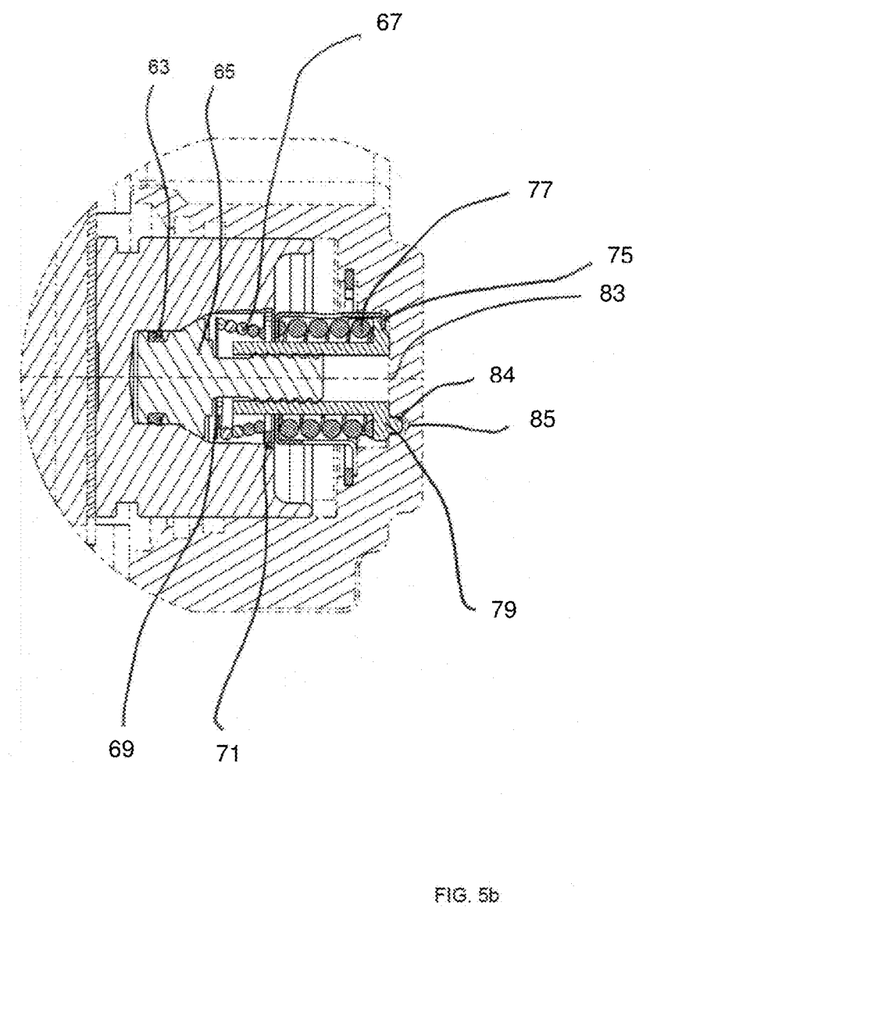
FIG. 5b shows an embodiment of a brake piston in a portion of a brake caliper housing as disclosed herein.

FIG. 5a shows an exploded diagram of an embodiment of a second piston 18 including an embodiment of a brake gap adjustor or brake pad adjustor 61. The embodiment of a brake gap adjustor or brake pad adjustor 61 shown in FIG. 5a includes a seal 63, an adjustor spindle 65, a first spring 67, a washer 69, a first circlip 71, a second circlip 73, a cage 75, a second spring 77 and an adjustor nut 79. The second piston body 81, seal 63, adjustor spindle 65, first spring 67, washer 69 and first circlip 71 form a piston assembly unit 60. The second circlip 73, cage 75, second spring 77 and adjustor nut 79 form a housing assembly unit 62. FIG. 5b shows an embodiment of a second piston with a brake gap adjustor 61 assembled in an outboard leg of a brake caliper.

In operation, it can be desirable to adjust the non-actuated position of the first and/or second pistons 18, 17 in the caliper assembly 9 to compensate for wear of the first and/or second brake pads 13, 15 and the rotor 27. Such adjustment can maintain small gaps between the respective brake pads and brake pistons. If these gaps become too large, poor responsiveness of the brakes can result. If these gaps become too small, brake drag can occur. Accordingly, in the embodiment of a brake gap adjustor 61 shown in FIGS. 5a and 5b, when the brake system is actuated in the second operation mode, the second piston body 81 can be moved toward the second brake pad 15. Movement of the second piston body 81 towards the second brake pad 15 moves the adjustor spindle 65 to move with the piston body 81, with the adjustor spindle 65 held within the second piston body 81 with the first spring 67 pushing against the washer 69 and first circlip 71, the first circlip being fit into a seating position in the interior of second piston body 81. The movement of the adjustor spindle 65 in turn moves the adjustor nut 79 within the cage 75, against the second spring and away from the end of the piston bore 83. Due to the cooperating threads between the adjustor spindle 65 and the adjustor nut 79, a torque is also applied between the adjustor spindle 65 and adjustor nut 79.

The torque is resisted at least in part by cooperating extensions and recesses between the end of the adjustor nut 79 and end of the piston bore 83. FIG. 5b shows extensions 84 on the end of the adjustor nut 59 which are received in corresponding recesses 85 in the end of the piston bore 83. When the amount of movement of the second piston 17 (and the nut 79) is sufficient, movement increasing with wear of the brake pads and rotor, the extensions 84 will move out of the recesses 85, and continued movement results in the torque turning the adjustor nut 79 in relation to the adjustor spindle 65, where sufficient rotation can result in the extensions 84 aligned with recesses 85 after rotation of the adjustor nut 79 in relation to the adjustor spindle 65 with the result that the adjustor spindle 65 moving longitudinally in relation to the adjustor nut 79.

Figure 6:
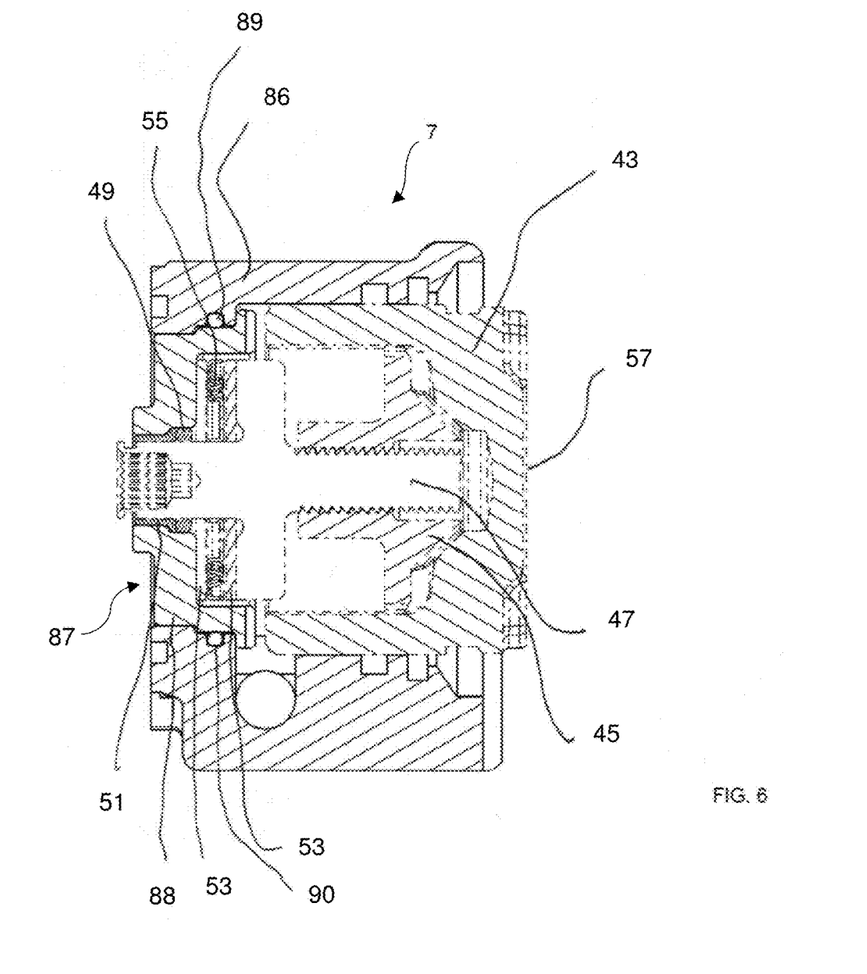
FIG. 6 shows an embodiment of a brake piston in a portion of a capped housing as disclosed herein.
Figure 6A:
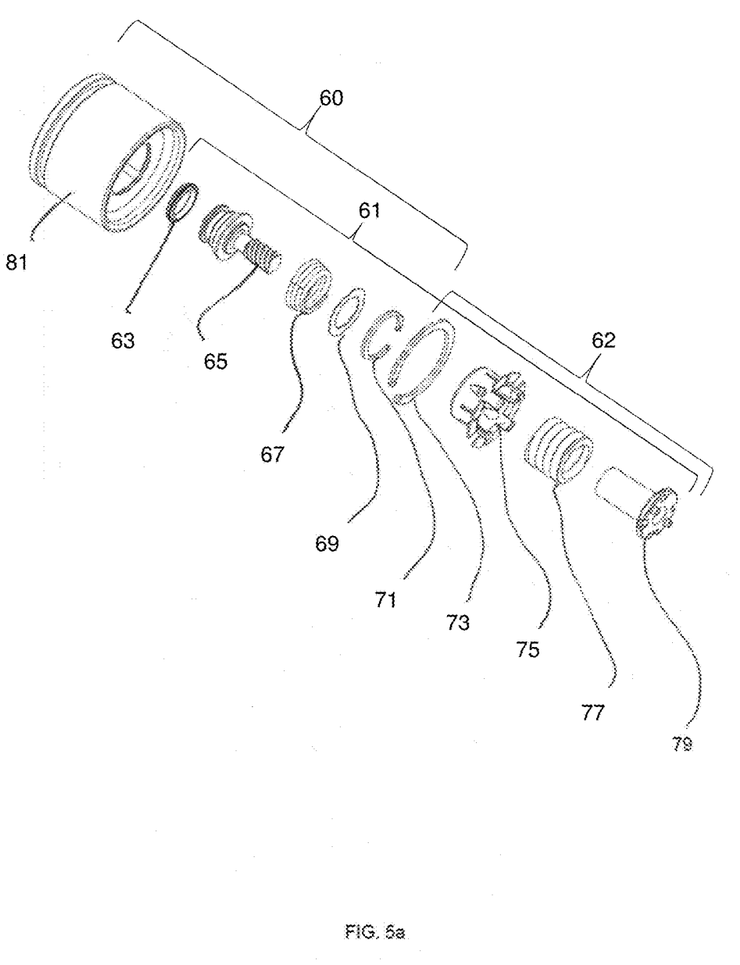

FIG. 6 shows an embodiment of a portion of a brake caliper 7 with a first brake piston 18, the first brake piston 18 includes a spindle 47 and nut 45 operable by a rotator, such as an electric motor 25. The brake caliper 7 shown in FIG. 6 includes a capped housing 86. In FIG. 6, the piston bore includes an opening 87 in the side of the housing opposite to the face 57 of the piston body 43. The opening 87 is shown with a cap 88 that closes the opening 87 to seal the housing 86 and the spindle 47. The cap 88 in FIG. 6 is sealed to the housing 86 with an o-ring 89 contained in a groove 90 in the housing. In other embodiments, the o-ring groove 90 can be present in the cap. In some embodiments, such as that shown in FIG. 7, an o-ring can be positioned at an angular region of the interface between the cap and housing, with or without an o-ring groove 90 present.

Figure 7:
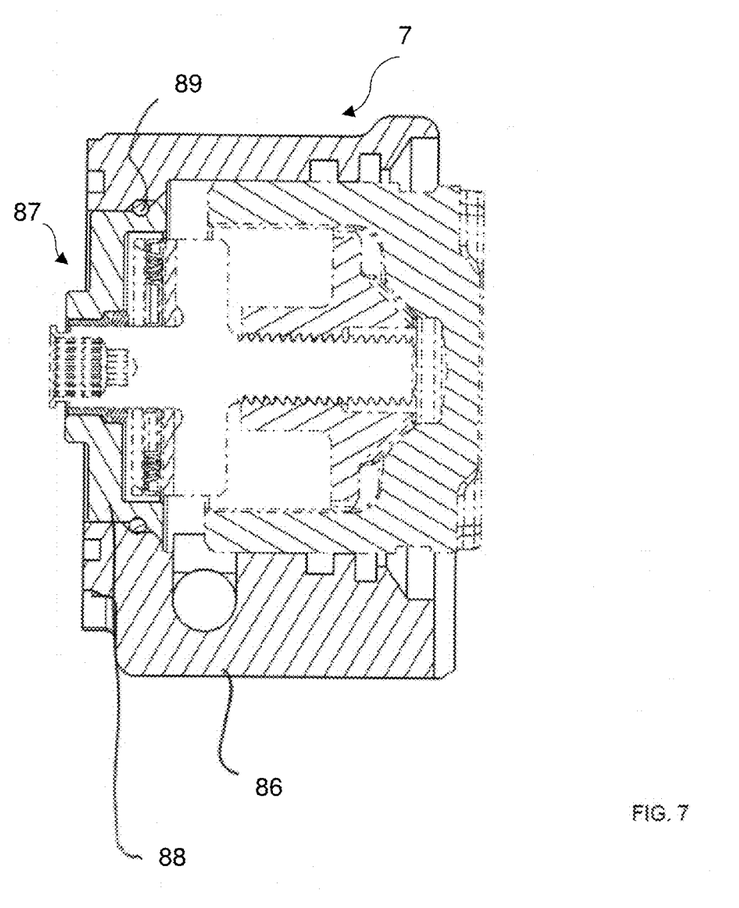
FIG. 7 shows an embodiment of a brake piston in a portion of a capped housing as disclosed herein.
Figure 8:
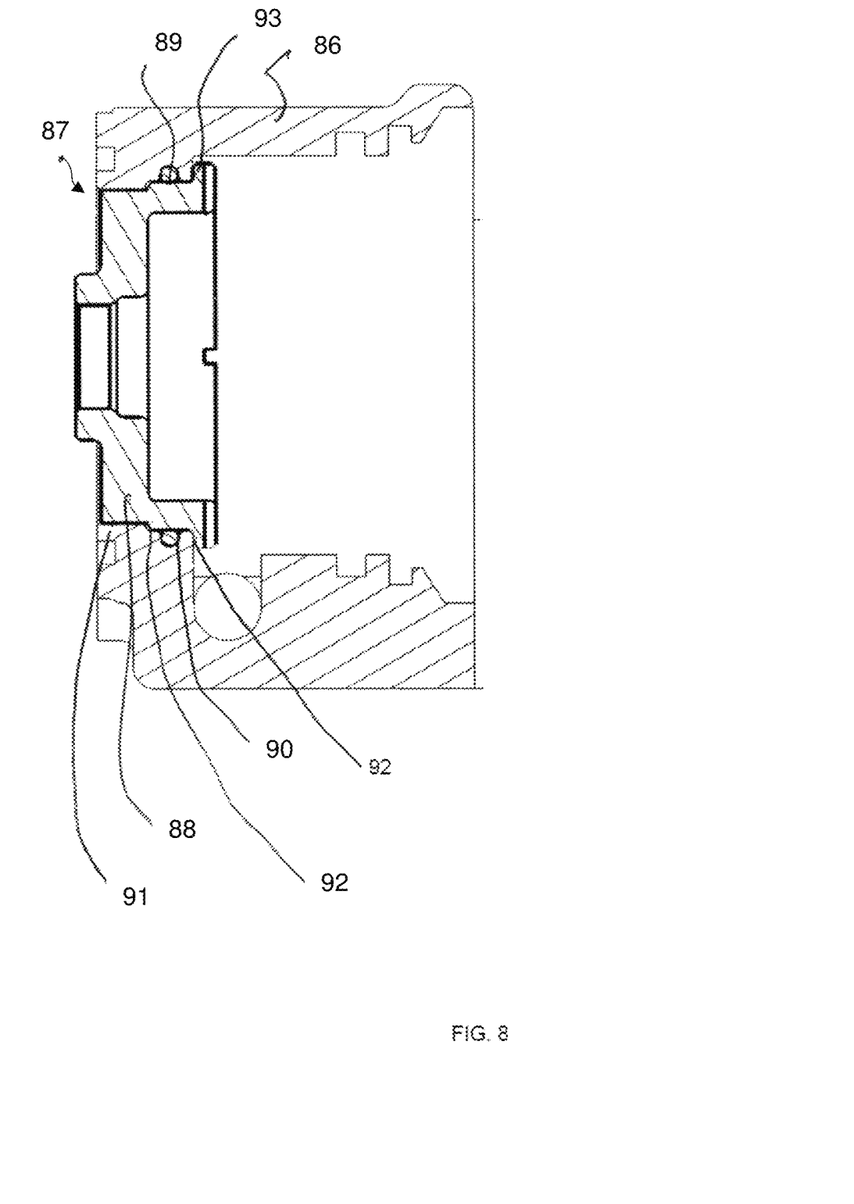
FIG. 8 shows an embodiment of a capped housing as disclosed herein.
Figure 9:
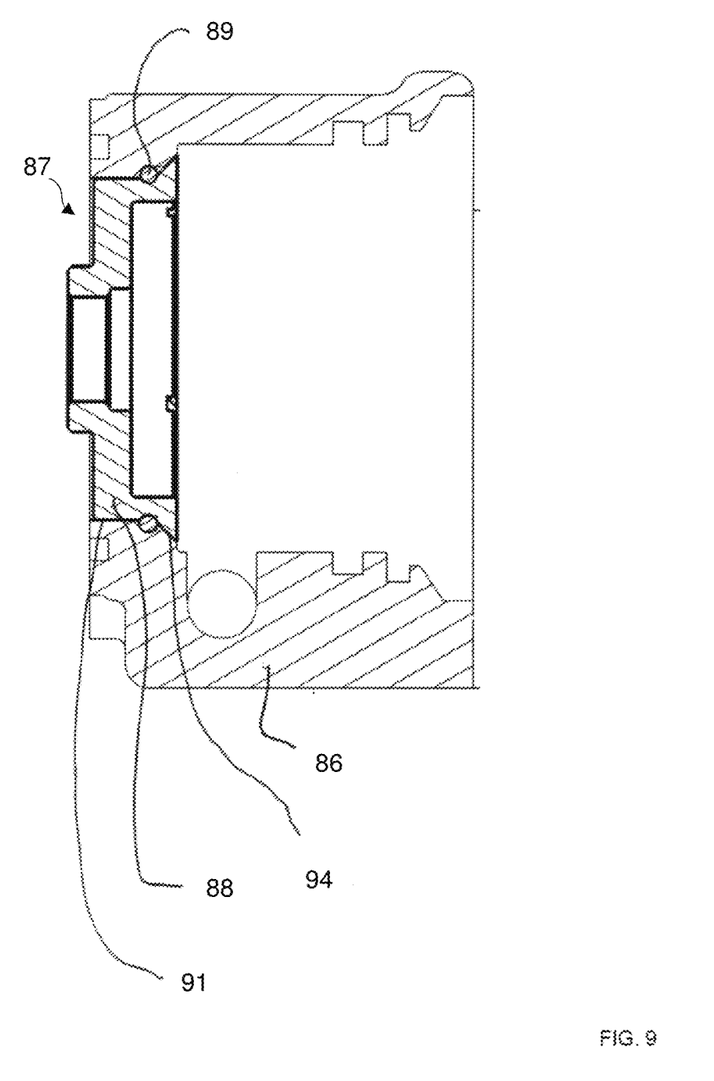
FIG. 9 shows an embodiment of a capped housing as disclosed herein.

FIGS. 8 and 9 show embodiments of capped housings 86 related to those shown in FIGS. 6 and 7, respectively, where the interface between the cap 88 and housing 86 includes a threaded section 91 where the cap threads into corresponding threads in the housing. In some embodiments, such as that shown in FIG. 8, the interface between the housing 56 and the cap 88 can comprise a series of stepped features 92, including a collar 93 forming a collar butting between the cap 88 and the housing 56. In some embodiments, such as that shown in FIG. 9, the interface between the housing 56 and the cap 88 can comprise a beveled section 94 forming a cone butting between the cap and the housing. The collar butting of FIG. 8 and the cone butting of FIG. 9 can provide a limit on the distance the cap is inserted into the housing.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

We claim:

1. A disk brake system, the system comprising:
   a brake rotor comprising:
     a hub configured for attachment to a vehicle,
     a first and a second contact surface, and
     a web connecting the first and second contact surfaces to the hub;
   a first and a second brake pad located adjacent to the respective first and second contact surfaces of the brake rotor, wherein the first and the second brake pads are configured to press on the respective first and second contact surfaces of the brake rotor during operation of the brake system;
   a first brake piston configured to push the first brake pad against the first contact surface of the brake rotor during operation of the brake system;
   a parking actuator comprising:
     a nut in communication with an interior of the first brake piston,
     a spindle in threaded communication with the nut and configured to be rotatable, and
     a parking brake rotator configured to rotate the spindle in relation to the nut;
   a second brake piston opposed to the first brake piston; and
   a pad adjustor in operational communication with the second brake piston, the pad adjustor comprising:
     an adjustor spindle, and
     an adjustor nut in threaded communication with the adjustor spindle,
   wherein upon operation of the brake system in a first operation mode, the first brake piston moves the second contact surface toward the second brake piston by deflection of the rotor at the web.

2. The brake system of claim 1, wherein the second brake piston is configured to push the second brake pad against the second surface of the rotor during operation of the brake system in a second mode of operation, wherein in the second mode of operation the first brake piston pushes the first brake pad toward the first surface of the brake rotor and the second brake piston pushes the second brake pad toward the second surface of the brake rotor.

3. The brake system of claim 1,
   wherein upon actuation of the parking brake, the brake system operates in the first operation mode and the parking brake rotator rotates the spindle which changes the thread position of the spindle in relation to the nut, extending the nut to push the first brake piston which pushes the first brake pad against the brake rotor and pushes the brake rotor against the second brake pad.

4. The brake system of claim 3, wherein the parking brake rotator comprises an electric motor.

5. The brake system of claim 3, wherein the parking brake rotator comprises a lever actuated by a handle.

6. The brake system of claim 2, wherein the first and second brake pistons are configured to be actuated hydraulically in the second mode of operation.

7. The brake system of claim 1, further comprising:
   a first spring disposed between the adjustor spindle and the second brake piston; and
   a second spring disposed between the adjustor nut and an outboard leg in which the second brake piston is disposed.

8. The brake system of claim 1, wherein the adjustor spindle is disposed in the second brake piston.

9. The brake system of claim 1, further comprising a first spring disposed between the adjustor spindle and the second brake piston,
   wherein the first spring and the adjuster spindle are disposed in the second brake piston, and the second brake piston is disposed in an outboard leg.

10. A disk brake caliper comprising:
    a caliper housing;
    a first brake piston;
    a second brake piston opposed to the first brake piston, the second brake piston having a front side facing the first brake piston and a reverse side facing away from the first brake piston;
    a parking brake actuator comprising:
      a nut in communication with an interior of the first brake piston,
      a spindle in threaded communication with the nut and configured to be rotatable, and
      a parking brake rotator configured to rotate the spindle in relation to the nut; and
    a pad adjustor in operational communication with the second brake piston, the pad adjustor comprising:
      an adjustor spindle;
      an adjustor nut in threaded communication with the adjustor spindle;
      a first spring; and
      a second spring;
    wherein the first spring forces the adjustor nut against the reverse side of the second brake piston and the second spring forces the adjustor nut against the caliper housing.

11. The disk brake caliper of claim 10 further comprising:
    an adjuster seal positioned between the adjuster spindle and a piston body;
    wherein upon actuation of the second brake piston, the adjuster spindle moves toward the first brake piston, the adjuster nut moves against the force of the second spring and rotates in relation to the adjuster spindle.

12. The disk brake caliper of claim 10, wherein upon rotation of the spindle, a thread position of the spindle changes in relation to the nut, extending the nut so as to push the first piston toward the second brake piston.

13. The disk brake caliper of claim 10, wherein:
the first spring is disposed between the adjustor spindle and the second brake piston, and
the second spring is disposed between the adjustor nut and an outboard leg in which the second brake piston is disposed.

14. The disk brake caliper of claim 10, wherein the adjustor spindle is disposed in the second brake piston.

15. The disk brake caliper of claim 10, wherein the first spring and the adjuster spindle are disposed in the second brake piston, and the second brake piston is disposed in an outboard leg.

* * * * *